US012638918B2

(12) United States Patent
Hurst

(10) Patent No.: US 12,638,918 B2
(45) Date of Patent: May 26, 2026

(54) ELECTROENCEPHALOGRAPH-BASED USER INTERFACE FOR VIRTUAL AND AUGMENTED REALITY SYSTEMS

(71) Applicant: Matthew Hurst, Myrtle Beach, SC (US)

(72) Inventor: Matthew Hurst, Myrtle Beach, SC (US)

( * ) Notice: Subject to any disclaimer, the term of this patent is extended or adjusted under 35 U.S.C. 154(b) by 0 days.

(21) Appl. No.: 18/425,742

(22) Filed: Jan. 29, 2024

(65) Prior Publication Data

US 2024/0168552 A1 May 23, 2024

Related U.S. Application Data

(63) Continuation of application No. 15/349,959, filed on Nov. 11, 2016, now Pat. No. 11,921,921.

(51) Int. Cl.
G06F 3/01 (2006.01)
(52) U.S. Cl.
CPC .............. G06F 3/015 (2013.01); G06F 3/011 (2013.01)
(58) Field of Classification Search
CPC ....................................................... G06F 3/015
See application file for complete search history.

(56) References Cited

U.S. PATENT DOCUMENTS

| | | | |
|---|---|---|---|
| 9,320,450 | B2 | 4/2016 | Badower |
| 2002/0128541 | A1 | 9/2002 | Kim et al. |
| 2005/0017870 | A1 | 1/2005 | Allison et al. |
| 2008/0208819 | A1 | 8/2008 | Wang et al. |
| 2013/0138011 | A1 | 5/2013 | Ang et al. |
| 2014/0184550 | A1 | 7/2014 | Hennessey et al. |
| 2016/0260261 | A1 | 9/2016 | Hsu |
| 2016/0270656 | A1 | 9/2016 | Samec et al. |

FOREIGN PATENT DOCUMENTS

CN          204990187 U        1/2016

*Primary Examiner* — Gustavo Polo
(74) *Attorney, Agent, or Firm* — John S. Sears; Lex Generalis, LLC

(57) ABSTRACT

An apparatus to analyze and manipulate biofeedback data is described. The apparatus includes a display that renders a simulated environment. The simulated environment is experienced by a user. The simulated environment is generated by a software program executing on a computer. A biofeedback sensor is coupled to the scalp of the user. The biofeedback sensor measures the electrical activity of the brain of the user when the user experiences the simulated environment. The biofeedback sensor generates electrical signals corresponding to the electrical activity such that the user is able to modify the simulated environment by manipulating the electrical activity in the brain.

21 Claims, 5 Drawing Sheets

EEG SYSTEM
504

COMPUTER/
GAMING SYSTEM
506

INPUT
DEVICE
508

AUDIO
OUT
510

VIDEO OUT
514

ELECTROENCEPHALOGRAPH-BASED USER INTERFACE FOR VIRTUAL AND AUGMENTED REALITY SYSTEMS

CROSS REFERENCE TO RELATED APPLICATIONS

This application is a continuation of U.S. Non-Provisional patent application Ser. No. 15/349,959, filed Nov. 11, 2016, the contents of which are incorporated by reference in their entirety.

TECHNICAL FIELD

The present invention relates to methods and apparatus to analyze and manipulate biofeedback data.

BACKGROUND OF THE INVENTION

Virtual reality (VR) and augmented reality (AR), mainstays in science fiction for the past few decades, are now a reality. VR is a computer technology that replicates a real or fictional environment, and simulates a user's physical presence and environment in a way that allows the user to interact with it. VR can artificially create sensory experiences, which can include sight, touch, hearing, and smell. AR is a live direct or indirect view of a physical, real-world environment whose elements are augmented or supplemented by computer-generated sensory input.

SUMMARY

In one aspect, the invention is embodied in an apparatus having a display that renders a simulated environment. The simulated environment is experienced by a user. The simulated environment is generated by a software program executing on a computer. A biofeedback sensor is coupled to the scalp of the user. The biofeedback sensor measures the electrical activity of the brain of the user when the user experiences the simulated environment. The biofeedback sensor generates electrical signals corresponding to the electrical activity such that the user is able to modify the simulated environment by manipulating the electrical activity in the brain.

An analog-to-digital converter receives the electrical signals from the biofeedback sensor. The analog-to-digital converter converts the electrical signals to digital signals that are transmitted to the computer.

In one embodiment, the software program modifies the simulated environment in response to the digital signals that are transmitted to the computer. For example, the user can manipulate the electrical activity in the brain by thinking about modifying the simulated environment.

In alternate embodiments, the display can be a head-mounted display, a liquid crystal display (LCD), a light emitting diode (LED) display, an organic light-emitting diode (OLED) display, or a plasma display. In alternate embodiments, the computer is a personal computer, a mobile computer, a laptop computer, a tablet computer, or a gaming console.

In one embodiment, the biofeedback sensor comprises an electroencephalography sensor. An amplifier can be coupled to the biofeedback sensor for amplifying the electrical signals.

In alternate embodiments, the simulated environment includes either a virtual reality or an augmented reality environment. In alternate embodiments, the electrical activity corresponds to one or more of delta waves, theta waves, alpha waves, mu waves, SMR waves, beta waves, and gamma waves.

In another aspect, the invention is embodied in a method. The method includes generating a simulated environment with a software program executing on a computer. The simulated environment is rendered on a display such that the simulated environment is experienced by a user.

The method further includes measuring electrical activity of the brain of the user when the user experiences the simulated environment. Electrical signals corresponding to the electrical activity are generated such that the user is able to modify the simulated environment by manipulating the electrical activity in the brain. The electrical signals are converted to digital signals and the digital signals are transmitted to the computer.

In alternate embodiments, the display is a head-mounted display, a liquid crystal display (LCD), a light emitting diode (LED) display, an organic light-emitting diode (OLED) display, or a plasma display. In alternate embodiments, the electrical activity corresponds to one or more delta waves, theta waves, alpha waves, mu waves, SMR waves, beta waves, or gamma waves.

In one embodiment, measuring electrical activity of the brain includes coupling a biofeedback sensor to the scalp of the user. The simulated environment can be a virtual reality environment or an augmented reality environment. The simulated environment can be modified in response to the digital signals. In one embodiment, the user manipulates the electrical activity in the brain by thinking about modifying the simulated environment.

In yet another aspect, the invention is embodied in an apparatus including a means for rendering a simulated environment that is experienced by a user. The simulated environment is generated by a software program executing on a computer.

The apparatus also includes means for measuring electrical activity of the brain of the user when the user experiences the simulated environment and generating electrical signals corresponding to the electrical activity such that the user is able to modify the simulated environment by manipulating the electrical activity in the brain. The apparatus further includes means for converting the electrical signals to digital signals and transmitting the digital signals to the computer.

BRIEF DESCRIPTION OF THE DRAWINGS

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

The above and further advantages of this invention may be better understood by referring to the following description in conjunction with the accompanying drawings, in which like numerals indicate like structural elements and features in various figures. Skilled artisans will appreciate that reference designators shown herein in parenthesis indicate components shown in a figure other than the one in discussion. For example, talking about a device (10) while discussing Figure A would refer to an element, 10, shown in figure other than Figure A.

DESCRIPTION OF PREFERRED EMBODIMENTS

The following detailed description is merely illustrative in nature and is not intended to limit the invention or the application and uses of the invention. Furthermore, there is no intention to be bound by any express or implied theory presented in the preceding technical field, background, brief summary or the following detailed description.

Techniques and technologies may be described herein in terms of functional components and various processing steps. It should be appreciated that such components may be realized by any number of hardware components configured to perform the specified functions.

The following description may refer to elements or features being "connected" or "coupled" together. As used herein, unless expressly stated otherwise, "connected" means that one element/feature is directly joined to (or directly communicates with) another element/feature. Likewise, unless expressly stated otherwise, "coupled" means that one element/feature is directly or indirectly joined to (or directly or indirectly communicates with) another element/feature. The term "exemplary" is used in the sense of "example, instance, or illustration" rather than "model," or "deserving imitation."

Technologies and concepts discussed herein relate to apparatus and methods to analyze and manipulate biofeedback data. The apparatus includes a display that renders a simulated environment that is experienced by a user. The simulated environment is generated by a software program executing on a computer. A biofeedback sensor is coupled to the scalp of the user. The biofeedback sensor measures the electrical activity of the brain of the user when the user experiences the simulated environment. The biofeedback sensor generates electrical signals corresponding to the electrical activity such that the user is able to modify the simulated environment by manipulating the electrical activity in the brain.

Figure 1:
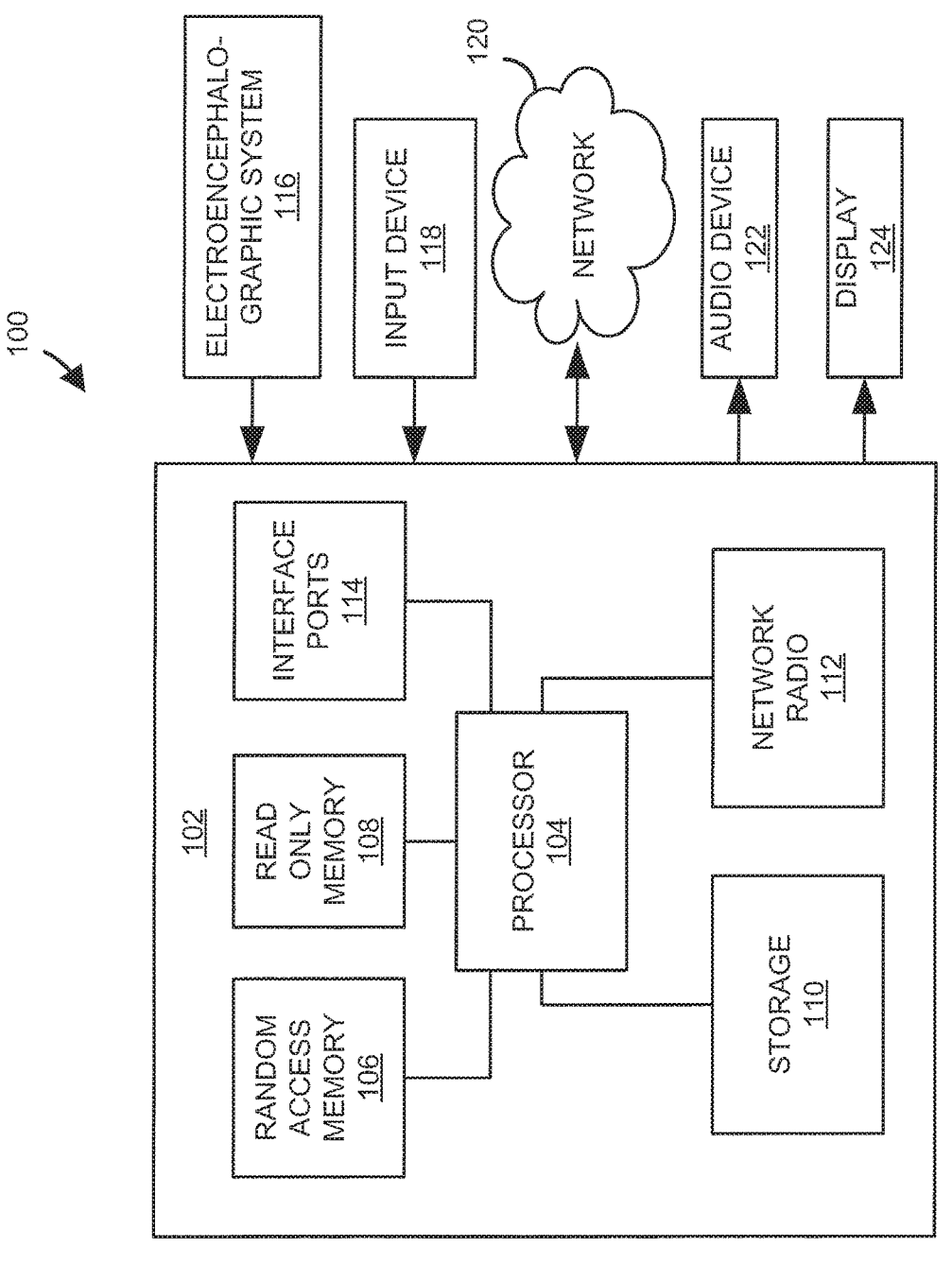
FIG. 1 is a block diagram of one embodiment of a biofeedback system according to the invention.

FIG. 1 is a block diagram of one embodiment of a biofeedback system 100 according to the invention. The biofeedback system 100 includes a computer 102. The computer 102 could be a personal computer, such as a laptop or desktop computer. The computer 102 could also be a gaming system. In one embodiment, the computer 102 is a mobile device, such as a smart phone. The computer 102 includes a processor 104. The processor 104 is coupled to a random access memory 106, a read only memory 108, a storage device 110, a radio 112, and one or more interface ports 114. The interface ports 114 can be a serial interface, such as a universal serial bus, a parallel port, or any other suitable interface. The processor 104 is configured to execute software programs resident on the storage device 110. The storage device 110 can be a hard disk, a flash memory, or a prom chip, for example.

The biofeedback system 100 also includes an EEG system 116. The EEG system 116 collects electrical signals corresponding to the activity of the brain. The electrical signals are provided to the computer 102 through the interface ports 114. The biofeedback system 100 can also include an input device 118 coupled to the computer 102. The input device 118 can be a keyboard, microphone, mouse, joystick, gaming controller, or any other suitable device. In one embodiment, the input device 118 includes a motion sensor, such as an accelerometer, that is integrated with a wearable device, such as a headset. In this embodiment, a movement of a user's head is interpreted as an input by the computer 102.

In one embodiment, the network radio 112 in the computer 102 can communicate with a network 120. The network 120 can be a wide area network, a local area network, or a personal area network, such as a Bluetooth or Zigbee network. In one embodiment, the EEG system 116 communicates with the computer 102 through the network 120. In this embodiment, the EEG system 116 is not tethered to the computer 102 with wires.

The computer 102 can be coupled to an audio device 122 such as a speaker or a headphone. The audio device 122 reproduces sound generated by the computer 102. In one embodiment, the computer 102 is coupled to a display 124. The display 124 can be a liquid crystal display (LCD), a light emitting diode (LED) display, a plasma display, or any other suitable display. In one embodiment, the display 124 can be a head-mounted display, such as a virtual reality headset display.

In operation, the computer 102 receives inputs from the user through the EEG system 116 and the input device 118. The computer 102 collects the EEG data and a software application executing on the processor analyzes the EEG data. In one embodiment, the software application can generate a simulated environment with which the user can experience and/or interact. A biofeedback sensor in the EEG system 116 measures the electrical activity of the brain of the user when the user experiences the simulated environment generated by the software application. The biofeedback sensor generates electrical signals corresponding to the electrical activity such that the user is able to modify the simulated environment by manipulating the electrical activity in the brain.

The EEG data collected by the computer 102 is input to the software and the simulated environment is modified by the changing thoughts of the user. The computer 102 outputs data to the display 124 and the audio device 122. Thus, the user experiences the changes in the simulated environment through sights and sounds output by the computer 102. Skilled artisans will appreciate that the computer could also control other devices, such as robots, actuators, aroma generators, and massagers, for example.

During operation, the computer 102 continually receives brainwave data. The EEG system 116 communicates the specific brain wave band being transmitted to the computer 102. For example, the EEG system 116 can communicate alpha, mu, SMR, beta, theta, or gamma wave data to the computer 102. The computer 102 then analyzes the data to determine which part of the user's brain is being stimulated at each moment in time.

In one embodiment, the software executing on the computer 102 includes highly sophisticated feedback algorithms that "learn" the thoughts of individual users based on millions of points of data collected. Thus, the software can interact with individual users operating in a virtual reality environment by analyzing the user's brain wave activity. Additionally, the user can manipulate the virtual environment by merely thinking about the modification. In another embodiment, the user can manipulate elements, such as sound, video, or graphics, in an augmented reality environment by thinking about manipulating the elements in the augmented reality environment.

In one example, the software executing on the computer 102 can display a ball in a virtual reality environment. The user views the ball on the display 124, either using a head-mounted display or using a standard display device, for example. As the user focuses on the ball, the EEG system 116 detects brain wave activity related to the user viewing the ball. As the user imagines the ball rising, the EEG system 116 detects changes in the user's brain wave activity. The brain wave activity is analyzed by the computer 102 and the user observes the ball rising on the display 124.

As previously described, the EEG system 116 determines brain wave activity of the user's brain by detecting microvoltages corresponding to one or more of delta, theta, alpha, mu, SMR, beta, and gamma frequency bands having ranges of about 0.1-4 Hz, 3.5-7.5 Hz, 7.5-15 Hz, 7.5-12.5 Hz, 12.5-15.5 Hz, 14-31 Hz, and 32-100 Hz, respectively. It is known in the art that theta and beta wave activity can directly indicate the level of attention and cognitive processing of the brain of the user. For example, a decrease in theta wave activity can indicate an increase in focus and/or attention, and an increase in beta wave activity can indicate an increase in cognitive processing.

Figure 2:
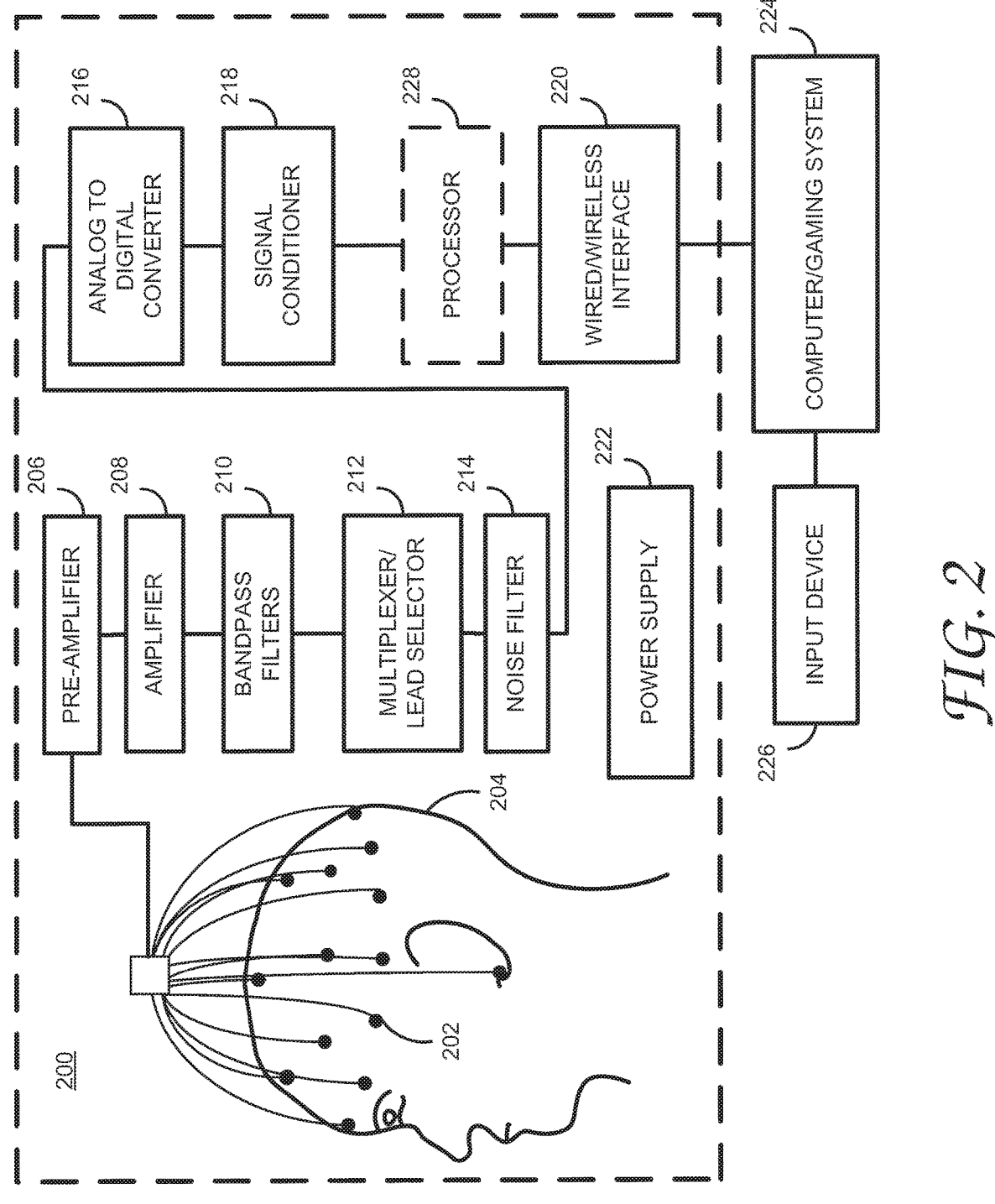
FIG. 2 is a block diagram of one embodiment of an electroencephalography sensor according to the invention.

FIG. 2 is a block diagram of one embodiment of an electroencephalography (EEG) system 200 according to the invention. The block diagram of FIG. 2 illustrates the individual system components in terms of hardware, but skilled artisans will appreciate that some components can be software components, as will be further described herein.

The EEG system 200 includes electrodes 202 which are coupled to various locations on a user's scalp 204. The electrodes 202 are designed to detect microvolts of electrical signals from the user's brain (EEG activity). The EEG activity changes in response to the brain responding to one or more of the five senses being stimulated as well as electrical activity created from thinking. Skilled artisans will appreciate that electrical activity can also be measured within the user's cranium.

The EEG activity is grouped into several different frequency bands. For example, the brain waves can include the delta band which includes frequencies between about 0.1 Hz and 4 Hz and is associated with sleep. The theta band includes frequencies between about 3.5 Hz and 7.5 Hz and is associated with attention. The alpha band includes frequencies between about 7.5 Hz and 12.5 Hz and is associated with relaxation. The mu band includes frequencies between about 7.5-15 Hz and is associated with voluntary movement. The SMR band is associated with states of idleness or relaxation. The beta band includes frequencies between about 14 Hz and 31 Hz and is associated with motor control and decision making. The gamma band includes frequencies between about 32 Hz and 100 Hz and are associated with motor function, as well as attention and memory.

The skin layers and skull bone tend to weaken frequency waves above 75 Hz making it difficult to measure higher frequency waves using EEG electrodes 202. However, frequency waves below 75 Hz can be accurately measured using EEG electrodes 202, thereby providing meaningful information about a user's mental state. Skilled artisans will appreciate that the measured EEG signals are on the order of microvolts and millisecond voltage fluctuations can be associated with electrical activity of the brain.

The electrodes 202 can contact the scalp 204 in various ways. For example, the electrodes can be individually attached to the scalp 204 using a conductive gel. Alternatively, the electrodes 202 could be attached to a head piece, such as a skull cap, helmet, or other head worn device.

The EEG system 200 also includes a pre-amplifier 206, an amplifier 208, bandpass filters 210, multiplexer 212, noise filter 214, an analog-to-digital converter (ADC) 216, a signal conditioner 218, an interface 220, and a power supply 222. The power supply 222 can be a portable power supply, such as a battery. The power supply 222 provides power to the various circuits in the EEG system 200. The EEG system 200 can be connected to a computer/gaming system 224 through the interface 220. The interface 220 can be either hard-wired or wireless. In the wireless embodiment, the EEG system 200 communicates with the computer/gaming system 224 through a wireless network. In one embodiment, the EEG system 200 is coupled to a network (not shown), such as a wide area network, local area network, or a personal area network through the interface 220. The computer/gaming system 224 can include one or more input devices 226, such as a keyboard, microphone, mouse, or a game controller. The computer/gaming system 224 can include a display (not shown) and an audio output device (not shown).

The electrodes 202 are configured to measure voltage levels in the microvolt level. In one example, frequencies in the theta range can be less than 100 microvolts, and frequencies in the beta range can be less than a few microvolts. In order to boost and condition the signals from the electrodes 202, the electrodes 202 are coupled to the pre-amplifier 206. The pre-amplifier 206 is coupled to an amplifier 208. The amplifier 208 is a low-noise, differential amplifier that further amplifies the signals. The amplifier 208 is coupled to the bandpass filters 210. The bandpass filters 210 separate the signals into various bands corresponding to the different frequencies of electrical activity of the brain. Skilled artisans will appreciate that the bandpass filters 210 can be hardware filters or can be software filters. Additionally, the EEG system 200 can include other circuits for limiting noise or amplifying signals, for example.

The level of electrical activity in different frequency bands corresponds to activity in different parts of the brain. Thus, electrical activity in different areas of the brain that control different thoughts, senses, and functions can be measured and mapped. The bandpass filters 210 can be coupled to the multiplexer 212. The multiplexer 212 acts as a switch to select each different frequency band of interest.

The multiplexer 212 is coupled to the optional noise filter 214. The noise filter 214 removes any residual noise from the signals. The noise filter 214 is coupled to the analog-to-digital converter 216.

The analog-to-digital converter 216 converts the analog signal corresponding to the frequency band of interest to a digital signal for further processing. The digital signal can be provided to the signal conditioner 218. In one embodiment, the signal can be provided to an optional processor 228 for processing. In another embodiment, the signal can be provided to a computer/gaming system 224 through the interface 220. As previously described, the interface 220 can be a wired or wireless interface.

Figures 3A, 3B:
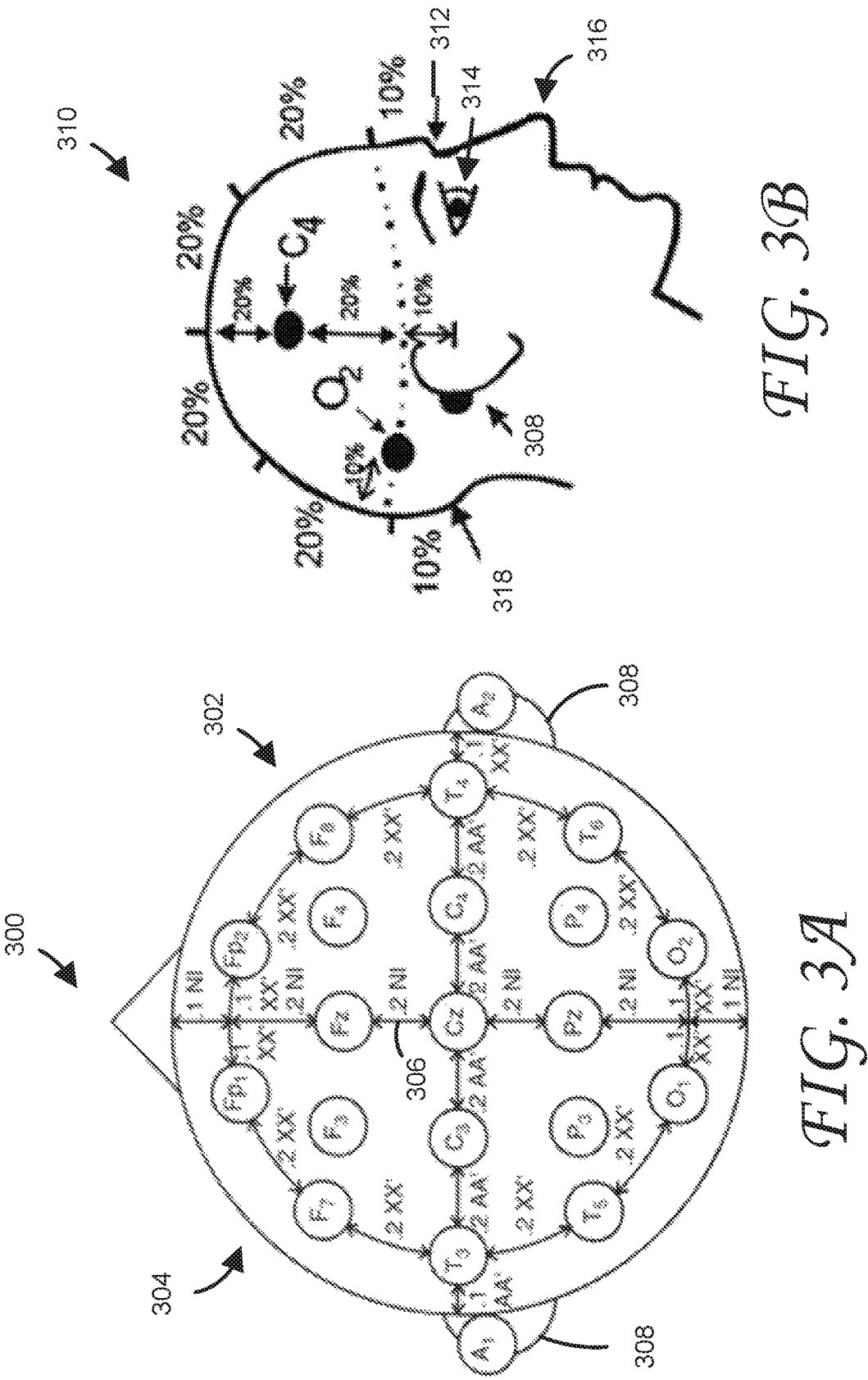
FIG. 3A illustrates a pictorial representation of the 10-20 system.
FIG. 3B is a side view of a user's head illustrating the 10-20 system according to the invention.

FIG. 3A illustrates a pictorial representation of the 10-20 system 300. In one embodiment of the invention, the 10-20 system 300 can be used to locate the electrodes in the headpiece. The 10-20 system 300 is an internationally recognized method to describe and apply the location of scalp electrodes in the context of an EEG sensor. The 10-20 system 300 ensures standardized reproducibility so that a user's results could be compared over time and/or multiple subjects can be compared to each other. This system 300 is based on the relationship between the location of each electrode relative to the underlying area of cerebral cortex. The "10" and "20" refer to the fact that the actual distances between adjacent electrodes are either 10% or 20% of the total front-back or right-left distance of the skull.

Each site has a letter to identify the lobe and a number to identify the hemisphere location. The letters F, T, C, P and O stand for frontal, temporal, central, parietal, and occipital lobes, respectively. It should be noted that no central lobe exists. The letter "C" is used only to identify the center of the skull. The even numbers (2,4,6,8) refer to electrode positions on the right hemisphere 302 of the skull. The odd numbers (1,3,5,7) refer to electrode positions on the left hemisphere 304. The letter "z" stands for zero and refers to an electrode placed on the midline 306. In addition to these combinations, the letter codes A, Pg and Fp identify the earlobes, nasopharyngeal and frontal polar sites respectively. Electrodes corresponding to A1 and A2 are attached to the ears 308 of the user.

FIG. 3B is a side view of a user's head 310 illustrating the 10-20 system 300 according to the invention. Two anatomical features are used for the essential positioning of the EEG electrodes. The first feature is known as the nasion 312. The nasion 312 refers to the distinctly depressed area between the eyes 314, just above the bridge of the nose 316. The second feature is known as the inion 318. The inion 318 is the lowest point of the skull on the back of the head 310 and is normally indicated by a prominent bump.

In another embodiment of the invention, a 10-5 system (not shown) can be used to position the electrodes on a user's head. The 10-5 system uses more electrodes than the 10-20 system 300. In general, the 10-5 system adds additional electrodes halfway between locations in the 10-20 system 300. The 10-5 system uses 1, 3, 5, 7, 9, for the left hemisphere, which corresponds to 10%, 20%, 30%, 40%, 50% of the inion-to-nasion distance, respectively. The introduction of extra letter codes provides for the naming of the intermediate electrode positions. The new letter codes for the intermediate sites are: AF—intermediate between Fp and F, FC—intermediate between F and C, FT—intermediate between F and T, CP—intermediate between C and P, TP—intermediate between T and P, PO—intermediate between P and O. Also, the 10-5 system renames four points of the 10-20 system 300—T3, T4, T5 and T6—as T7, T8, P7 and P8, respectively.

Figures 4, 5:
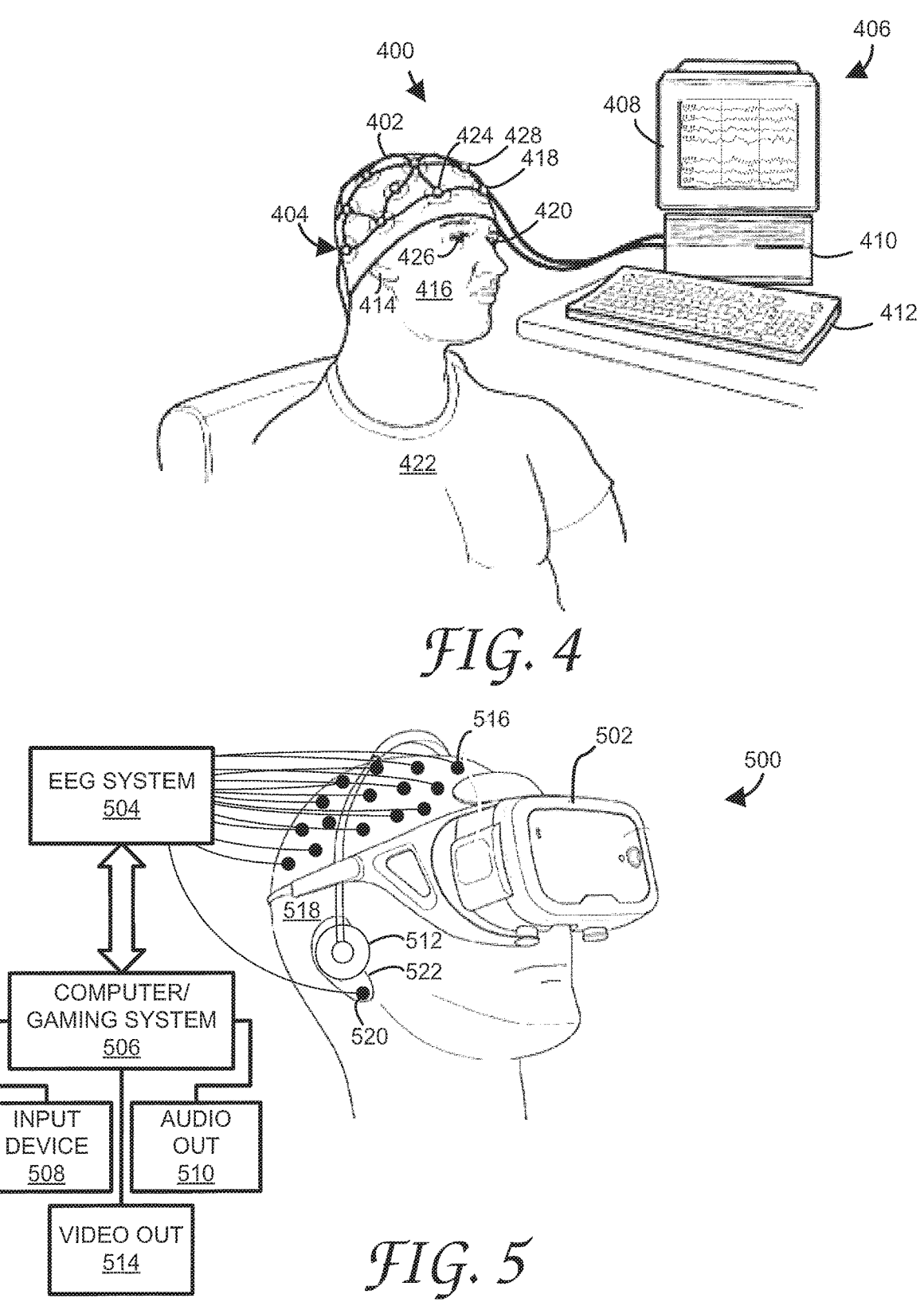
FIG. 4 illustrates a pictorial representation of one embodiment of a biofeedback system according to the invention.
FIG. 5 illustrates a pictorial representation of one embodiment of a biofeedback system having a head mounted display according to the invention.

FIG. 4 illustrates a pictorial representation of one embodiment of a biofeedback system 400 according to the invention. The biofeedback system 400 includes a headpiece 402 which includes integrated electrodes 404. The electrodes 404 are positioned in various locations on the headpiece 402. The locations correspond to areas of the brain which are associated with various brain activity of interest. In embodiment shown in FIG. 4, the electrodes 404 are hardwired to a computer 406.

The computer 406 includes a display 408, a processing unit 410, and an input device 412. In this embodiment, the input device 412 is a keyboard. Skilled artisans will appreciate that the input device 412 can be any suitable input device, such as a mouse, microphone, accelerometer, trackball, joystick, or gaming controller, for example.

The headpiece 402 is generally spherical in shape. In one embodiment (not shown), the headpiece 402 includes cutouts on either side for accommodating a user's ears 414. The cut-outs can also ensure that the user positions the headpiece 402 properly on the user's head 416. In practice, any suitable positioning guide can be used.

The electrodes 404 are configured to detect EEG signals from the head 416 of the user. For example, a first electrode 418 is located on the headpiece 402 above the left eye 420 of the user 422. This position is known as FPI. A second electrode 424 is located on the headpiece 402 above the right eye 426 of the user 422. This position is known as FP2. A third electrode 428 is positioned on the forward center of the cranium 416. This position is known as Fz. This electrode 428 detects the sensory motor rhythm (SMR) brain wave. The headpiece 402 can also include additional electrodes, such as a reference electrode and a ground electrode. In general, the electrodes 404 extend inwardly from the headpiece 402, such that the tips of the electrodes 404 contact the scalp of the user 422. In one embodiment, one or more of the electrodes 404 are releasably attached to the headpiece 402.

The headpiece 402 is preferably designed to comfortably fit the head 416 of the user 422. The headpiece 402 can be fabricated from any suitable material or combination of materials, such as fabric, vinyl, rubber, foam, leather, or plastic, for example. In one embodiment, the headpiece 402 includes one or more openings (not shown) to ventilate of the headpiece 402.

FIG. 5 illustrates a pictorial representation of one embodiment of a biofeedback system 500 having a head mounted display 502 according to the invention. The biofeedback system 500 includes an EEG system 504 and a computer/gaming system 506. The computer/gaming system 506 can be configured to accept an input device 508, such as a mouse, keyboard, microphone, accelerometer, or gaming controller. The computer/gaming system 506 can also be configured to output audio 510 to a headphone 512 or a speaker (not shown). The computer/gaming system 506 can be configured to output video 514 to the head mounted display 502 or a standard computer display (not shown).

The EEG system 504 can include multiple electrodes 516 that are in contact with the user's scalp 518. In one embodiment, a reference electrode 520 can be coupled to the user's ear 522.

Figure 6:
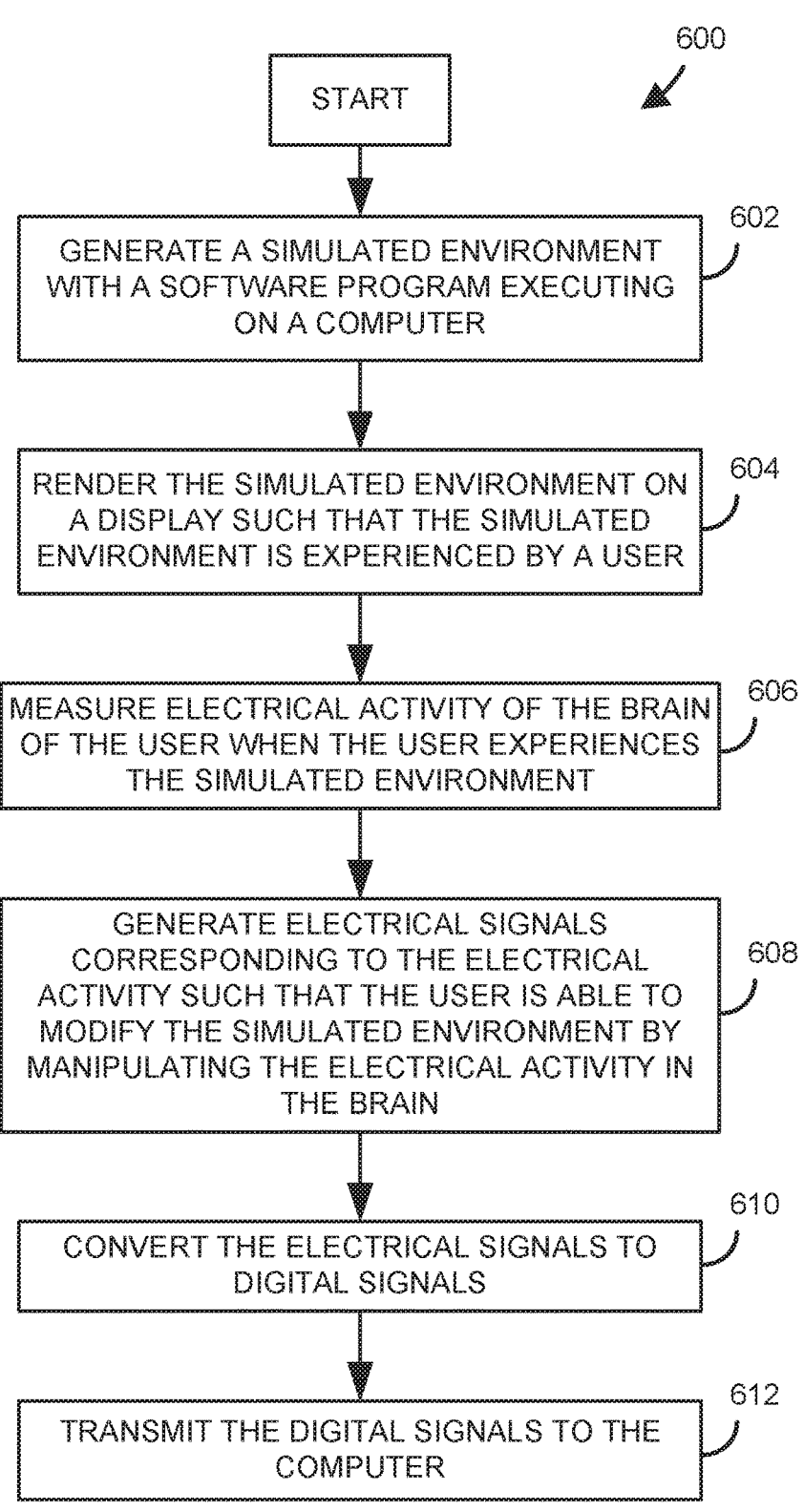
FIG. 6 illustrates a method for modifying a computer-generated simulated environment according to one embodiment of the invention.

FIG. 6 illustrates a method 600 for modifying a computer-generated simulated environment according to one embodiment of the invention. In one step 602, a software program executing on a computer generates a simulated environment.

The simulated environment can be a virtual reality environment or an augmented reality environment, for example.

In another step 604, the simulated environment is rendered on a display that is coupled to the computer. The simulated environment is displayed so as to be experienced by the user. For example, the display can be a head-mounted display worn on the head of the user. Alternatively, the display can be a computer display, such as a liquid crystal display (LCD), light emitting diode (LED), or plasma display, for example. In practice, any suitable display can be used, including a television display, for example.

In another step 606, an EEG sensor measures the electrical activity of the brain of the user when the user experiences the simulated environment. The EEG sensor includes electrodes that are coupled to the scalp of the user. The electrodes detect micro-voltages generated by the brain corresponding to different frequency bands which depend on the location on the scalp of each electrode.

In step 608, the measured electrical activity is processed by the EEG sensor to generate electrical signals which are transmitted to the computer. In step 610, the electrical signals are converted to digital signals by the EEG sensor. The digital signals are then transmitted to the computer in step 612. The computer interprets the digital signals and modifies the simulated environment in response to the measured electrical activity of the user's brain. The user manipulates the electrical activity in the brain merely by thinking about modifying the simulated environment.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In addition, the section headings included herein are intended to facilitate a review but are not intended to limit the scope of the present invention. Accordingly, the specification and drawings are to be regarded in an illustrative manner and are not intended to limit the scope of the appended claims.

In interpreting the appended claims, it should be understood that: the word "comprising" does not exclude the presence of other elements or acts than those listed in a given claim;

the word "a" or "an" preceding an element does not exclude the presence of a plurality of such elements;

any reference signs in the claims do not limit their scope; several "means" may be represented by the same item implemented structure or function;

any of the disclosed devices or portions thereof may be combined together or separated into further portions unless specifically stated otherwise; and no specific sequence of acts or steps is intended to be required unless specifically indicated.

What is claimed is:

1. An apparatus comprising:

a head-mounted display that renders a simulated environment that is experienced by a user when worn on the head of the user, the simulated environment comprising at least one computer-generated visual element being generated by a software program;

a biofeedback sensor coupled to the scalp of the user, the biofeedback sensor continuously measuring electrical activity in the brain of the user when the user experiences the simulated environment, the biofeedback sensor generating changing electrical signals corresponding to changing electrical activity in the brain of the user based on the brain of the user experiencing a change in the at least one computer-generated visual element in the simulated environment, wherein the user reacts to the change in the visual computer-generated visual element by thinking about modifying the computer-generated visual element in the simulated environment; and a computer that executes the software program, the computer receiving the changing electrical signals and using a feedback algorithm to learn how the received signals relate to intentions of the user, interpreting the digital signals based on the learned intentions, and rendering a modified visual element in the simulated environment that is experienced by the user through the head-mounted display, wherein the rendering of the modified visual element is based on interpreting the digital signals that correspond to the user thinking about modifying the at least one computer-generated element presented in the simulated environment.

2. The apparatus of claim 1, wherein the software program modifies the simulated environment in response to at least one of the digital signals, a position signal, or both that are transmitted to the computer.

3. The apparatus of claim 1, further comprising a motion sensor coupled to the head-mounted display, the motion sensor utilizing an accelerometer to sense a movement of the head of the user relative to the simulated environment and generating position signals corresponding to the movement of the user's head.

4. The apparatus of claim 1, wherein the head-mounted display comprises one of a liquid crystal display (LCD), a light emitting diode (LED) display, an organic light-emitting diode (OLED) display, and a plasma display.

5. The apparatus of claim 1, wherein the biofeedback sensor comprises an electroencephalography sensor.

6. The apparatus of claim 1, further comprising (a) an amplifier coupled to the biofeedback sensor for amplifying the electrical signals, (b) an analog-to-digital converter that receives the changing electrical signals from the biofeedback sensor corresponding to the changing electrical activity, the analog-to-digital converter converting the changing electrical signals to digital signals and providing the digital signals to the computer, or both (a) and (b).

7. The apparatus of claim 1, wherein the rendering of the modified visual element is performed without relying on motion-sensor signals or manual user inputs.

8. The apparatus of claim 1, further comprising a battery that provides power to at least one of the head-mounted display, the analog-to-digital converter and the computer.

9. The apparatus of claim 1, wherein the electrical activity corresponds to brain waves comprising at least one of delta waves, theta waves, alpha waves, mu waves, SMR waves, beta waves, and gamma waves.

10. The apparatus of claim 1, wherein the computer comprises one of a personal computer, mobile computer, laptop computer, tablet computer, and a gaming console.

11. The apparatus of claim 1, wherein the simulated environment is a virtual reality environment.

12. A method comprising:

generating at least one computer-generated visual element in a simulated environment with a software program executing on a computer rendering the simulated environment on a head-mounted display such that at least one computer-generated visual element is generated by a software program;

continuously measuring electrical activity in the brain of the user when the user experiences the simulated environment;

generating changing electrical signals corresponding to changing electrical activity in the brain of the user based on the brain of the user experiencing a change in the at least one computer-generated visual element in the simulated environment, wherein the user reacts to the change in the computer-generated visual element by thinking about modifying the computer-generated visual element in the simulated environment;

using a feedback algorithm to learn how the received electrical signals relate to an intention of the user; and rendering a modified visual element in the simulated environment that is experienced by the user through the head-mounted display in response to the software program interpreting the electrical signals and the learned intention, wherein the rendering of the modified visual element is based on interpreting the digital signals that correspond to the user thinking about modifying the at least one computer-generated visual element presented in the simulated environment.

13. The method of claim 12, wherein the head-mounted display comprises one of a liquid crystal display (LCD), a light emitting diode (LED) display, an organic light-emitting diode (OLED) display, and a plasma display.

14. The method of claim 12, wherein continuously measuring electrical activity of the brain comprises coupling a biofeedback sensor to the scalp of the user.

15. The method of claim 12, further comprising amplifying the electrical signals.

16. The method of claim 12, further comprising:

sensing a movement of the head of the user relative to the simulated environment with a motion sensor coupled to the head-mounted display and generating position signals corresponding to the movement of the user's head; and rendering a modified visual element in the simulated environment that is experienced by the user through the head-mounted display in response to the software program interpreting the position signals.

17. The method of claim 12, further comprising converting the changing electrical signals to digital signals.

18. The method of claim 12, wherein the electrical activity corresponds to brain waves comprising at least one of delta waves, theta waves, alpha waves, mu waves, SMR waves, beta waves, and gamma waves.

19. The method of claim 12, further comprising modifying the simulated environment in response to at least one of the digital signals and the position signals.

20. The method of claim 12, wherein the simulated environment is a virtual reality environment.

21. An apparatus comprising:

means for generating at least one computer-generated visual element in a simulated environment with a software program executing on a computer:

means for rendering the simulated environment on a head-mounted display comprising at least one computer-generated visual element;

means for continuously measuring electrical activity in the brain of the user when the user experiences the simulated environment;

means for generating changing electrical signals corresponding to changing electrical activity in the brain of the user based on the brain of the user experiencing a change in the at least one computer-generated visual element in the simulated environment, wherein the user reacts to the change in the computer-generated visual element by thinking about modifying the omputer-generated visual element in the simulated environment;

means for using a feedback algorithm to learn how the received electrical signals relate to intentions of the user; and means for rendering a modified visual element in the simulated environment that is experienced by the user through the head-mounted display in response to the software program interpreting the electrical signals and the learned intentions, wherein the rendering of the modified visual element is based on interpreting the digital signals that correspond to the user thinking about modifying the at least one computer-generated visual element presented in the simulated environment.

* * * * *